Oct. 13, 1925.  
A. KNEPPER  
1,557,173  
TRAILER HITCHING DEVICE  
Filed June 14, 1923
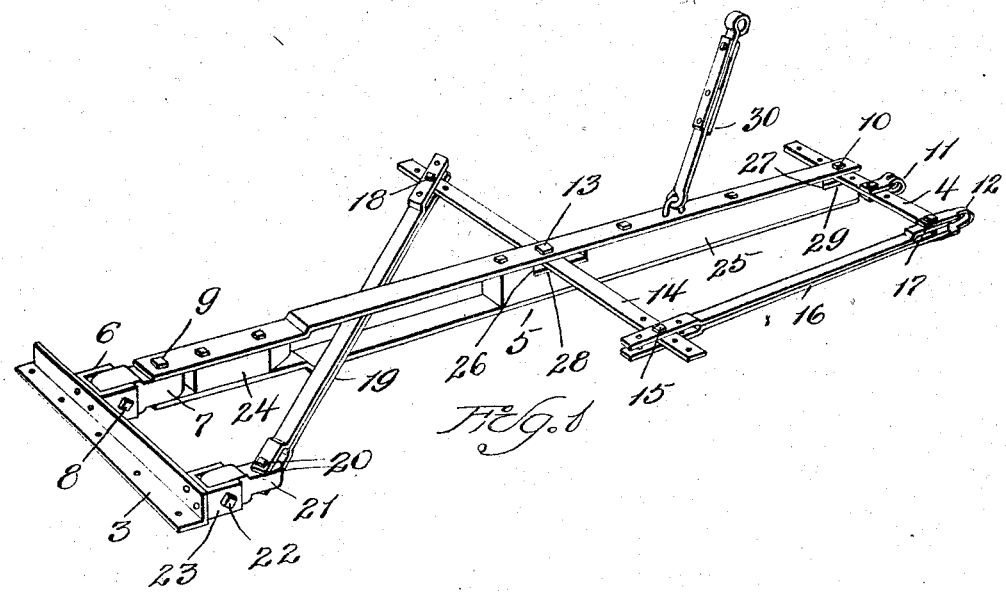
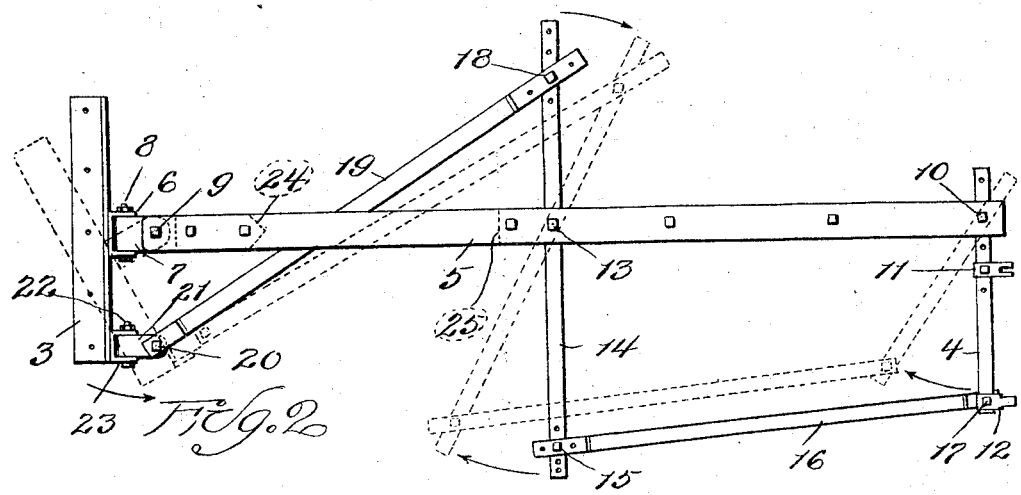
INVENTOR  
ARTHUR KNEPPER,  
by R. Georg Orwig Attorney.

Patented Oct. 13, 1925.                                           1,557,173

UNITED STATES PATENT OFFICE.

ARTHUR KNEPPER, OF BELLEVILLE, ILLINOIS, ASSIGNOR OF ONE-HALF TO MARCELL A. MILLER, OF BELLEVILLE, ILLINOIS.

TRAILER HITCHING DEVICE.

Application filed June 14, 1923.   Serial No. 645,292.

To all whom it may concern:

Be it known that I, ARTHUR KNEPPER, a citizen of the United States, residing at the city of Belleville, in the county of Saint Clair and State of Illinois, have invented a new and useful Trailer Hitching Device, of which the following is a specification.

My invention relates to trailer hitching devices, and more particularly to such devices as are employed for coupling a tractor with a binder whereby the steering of the binder, as desired, is automatically accomplished by the tractor.

Many devices for this purpose have been designed and are in use, and common to all of them is an element for connection with a tractor, or draft; an element for connection with a binder, or trailer, and means connecting said draft and trailer elements comprising relatively pivotally connected elements whereby the trailer element is turned, or steered, upon a turning of the draft element.

In use, such as with binders, it is important that the binder may, at times, be turned a greater distance than the turning of the tractor and yet be capable of "tracking", or have its wheels exactly follow the wheels of, the tractor, when moving in a straight course, hence there is of necessity a system of levers involving pivot joints. Due to travel over rough ground, or uneven surfaces, the tractor and binder are frequently tilted laterally and longitudinally with the result that great shearing stresses are applied at the pivot joints whose tendency is to wear and loosen such joints and which result sometimes in breakage thereof.

The object of my invention is to provide a trailer hitching device of simple and inexpensive, yet durable and efficient construction, involving a system of relatively pivoted elements, in which provision is made for the adjustment of the elements of the system whereby the degree of turning in the trailer, as effected by the turning of the tractor, or draft, may be selectively variable, and, involving further means in said system providing relative universal movements between certain of the elements of the system whereby undesirable stresses, due to lateral and longitudinal tilting of the tractor and trailer, will not be imparted to the pivot joints of the system.

My improvements consists in the novel construction, arrangement and combination of parts as hereinafter fully, clearly and concisely described, definitely pointed out in my claims and illustrated by the accompanying drawing, (1 sheet) in which—

Fig. 1 is a perspective view of a device constructed in accordance with my invention, and Fig. 2 is a plan view, showing by dotted lines the various elements shifted as upon a turning of the tractor.

Referring by numerals to the drawing 3 designates the tractor bar, 4 the binder bar and 5 the draft bar. For securement with the tractor bar there is a clevis 6 and between the clevis and draft bar there is a universal joint comprising a block 7 and pivot bolts 8 and 9. At the rear end of the draft bar there is a pivot bolt 10, carrying the binder bar 4 and carried by the binder bar are the clips 11 and 12 which act as universal joint connections between the binder bar and the binder (not shown).

Intermediate the pivot bolts 9 and 10 is a pivot bolt 13 carrying the translating bar 14 which carries at its one end a pivot bolt 15 for connection with the forward end of a link, or grain bar, 16, whose rear end is connected by a pivot bolt 17 with the free end of the binder bar 4. At the end of the translator bar, opposite the link, or grain bar 16 is a pivot bolt 18 for connection with the rear end of the cross bar 19, whose forward end extends to a pivot bolt 20 carried in a block 21, which block is supported on a pivot bolt 22 extended through a clevis 23 arranged for connection with the tractor bar to one side of the clevis 6.

As shown the draft bar 5 comprises a pair of spaced metallic straps, between which are the wooden reinforcing elements 24 and 25, whose rear and front ends are spaced relatively so that the cross bar 19 may be extended between the two straps of the draft bar. As best shown in Fig. 1 the wooden reinforcing elements 25 is recessed at 26 and 27 to receive the translating and binder bars and said bar are provided with wear plates 28 and 29. It is to be noted in this connection that the pivot bolts 10 and 13 are rigidly supported on both sides or faces of the translating and binder bars hence, although relatively light in weight are capable of withstanding great stresses.

It is to be noted further that by reason of the extension of the cross bar 19 through the draft bar, that is between the upper and lower straps thereof, only thrust or tension forces are delivered through the cross bar to the translating bar so that all torque strains are eliminated at the pivot joints.

For "tilting" the binder I provide the tilting arm 30 which connects the tilting mechanism (not shown) of the binder with the draft bar 5 as shown in Fig. 1.

I claim:

A trailer hitching device comprising a draft bar composed of vertically spaced metallic straps, longitudinally spaced reinforcing elements between said straps, a tractor bar, a universal joint connecting the draft bar and tractor bar, a binder bar, means for pivotally connecting the draft bar and binder bar, a translating bar, means for pivotally connecting the translating bar and draft bar, a grain bar, means for pivotally connecting one end of the grain bar with the translating bar and its other end with the binder bar, a cross bar, means for pivotally connecting one end of the cross bar with the translating bar and a universal joint for connecting the other end of the cross bar to the tractor bar, said cross bar being extended between the vertically spaced metallic straps of the draft bar and between the longitudinally spaced reinforcing elements of the draft bar.

ARTHUR KNEPPER.